(No Model.)

T. S. VERY.
COMPOUND FABRIC.

No. 364,786. Patented June 14, 1887.

Witnesses.
A. L. White
H. P. Brown

Inventor
T. S. Very
by Wright & Brown
Attys.

UNITED STATES PATENT OFFICE.

THEODORE S. VERY, OF BOSTON, MASSACHUSETTS.

COMPOUND FABRIC.

SPECIFICATION forming part of Letters Patent No. 364,786, dated June 14, 1887.

Application filed June 6, 1884. Serial No. 134,030. (No specimens.)

*To all whom it may concern:*

Be it known that I, THEODORE S. VERY, of Boston, in the county of Suffolk and State of Massachusetts, have invented certain Improvements in Compound Fabrics, of which the following is a specification.

This invention consists of a compound fabric composed of an outer layer or layers of silk, forming the exposed surface of the compound fabric, and an inner layer or backing of a cheaper and stronger fabric—such as cotton duck or drilling—united to the silk by a water-proof cement, the whole forming a strong and durable water-proof material adapted to be made into umbrellas or garments of various kinds and for various other uses.

Figure 1:
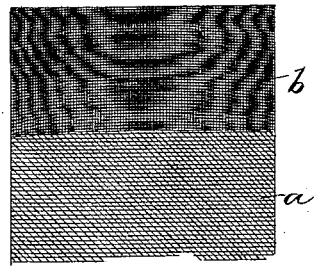
Figure 2:

Of the accompanying drawings, forming a part of this specification, Figure 1 represents a side view of a sheet or piece of my improved fabric. Fig. 2 represents a section thereof.

The same letters of reference indicate the same parts in both the figures.

In carrying out my invention I take as the base or backing of my compound fabric a sheet, $a$, of any suitable, cheap, and strong textile fabric—such as cotton duck or cotton drilling—and cement to one or both of its sides a covering, $b$, of silk, using, by preference, for the sake of cheapness, a silk containing a proportion of cotton. In uniting said parts I use a water-proof cement, which may be rubber dissolved with a suitable solvent, such as naphtha; or I may use a thin sheet of unvulcanized rubber spread between the two layers $a$ $b$ and united to both by heat and pressure. It is essential that the cement shall be so applied that the outer and inner fabric shall adhere at all points, which I accomplish by completely covering one or the other with the cement before uniting the pieces. The material thus produced combines the richness of appearance of the silk, the strength of the backing, and the water-repelling properties of the cement, and is, moreover, produced at a comparatively small expense, because the back and cement enable a cheap silk to answer the purpose as well as an expensive one. When only one side of the backing is covered with silk, the backing may be colored to correspond with the silk.

The described material is especially useful for water-proof coats, skirts, and other garments, and for umbrellas, and may be used for upholstery material. The intimate union between the silk and the cotton backing preserves the silk and prevents it from breaking and quickly wearing out, as silks, particularly of the cheaper grades, are liable to do.

It is obvious that satin may be used as the covering-layer without departing from the spirit of my invention.

I claim—

The improved compound water-proof fabric consisting of an outer layer or layers of silk or silky material and a backing or body of a cheaper or stronger fabric united to the outer layer or layers by a water-proof cement applied throughout its surface, as set forth.

In testimony whereof I have signed my name to this specification, in the presence of two subscribing witnesses, this 26th day of May, 1884.

THEODORE S. VERY.

Witnesses:
C. F. BROWN,
A. L. WHITE.